United States Patent

[11] 3,612,601

[72] Inventors John Farmington Himka;
 Samuel C. Pollock, both of Rochester, Minn.
[21] Appl. No. 5,788
[22] Filed Jan. 26, 1970
[45] Patented Oct. 12, 1971
[73] Assignee General Motors Corporation
 Detroit, Mich.

[54] VEHICLE CLOSURE ARRANGEMENT
 3 Claims, 8 Drawing Figs.
[52] U.S. Cl. .................................................. 296/51,
 49/163, 296/57 R, 296/106
[51] Int. Cl. ...................................................... B60j 5/10
[50] Field of Search .......................................... 296/50, 51,
 56, 57 R, 57 A, 106; 49/163, 169, 170

[56] References Cited
 UNITED STATES PATENTS

| | | | |
|---|---|---|---|
| 2,086,091 | 7/1937 | Payette ........................... | 296/51 X |
| 3,199,914 | 8/1965 | Smith .............................. | 296/106 |
| 2,796,287 | 6/1957 | Moyes ............................ | 296/57 |
| 1,883,473 | 10/1932 | Barrett ........................... | 296/51 |
| 1,517,697 | 12/1924 | Barrett ........................... | 296/51 |
| 1,483,890 | 2/1924 | Kelley ............................ | 296/51 |

Primary Examiner—Leo Friaglia
Assistant Examiner—Leslie J. Paperner
Attorneys—W. E. Finken and D. L. Ellis ABSTRACT: A tailgate assembly on the body member of a station wagon-type vehicle is moveable from a closed position closing the rear access opening to a first open position as a conventional drop-gate or to a second opened position as a lift-gate, and includes a frame member swingable about a horizontal transverse axis at the upper margin of the rear opening and a gate member swingable relative to the frame member about an axis thereof. In one position of the frame member the aforementioned axis thereof about which the tailgate member swings is oriented transversely of the body member at the lower margin of the rear opening so that the swinging movement of the gate member relative to the body member and the frame member is equivalent to conventional drop-gate operation while the gate member is swingable as a unit with the frame member as a lift-gate to completely expose the rear opening.

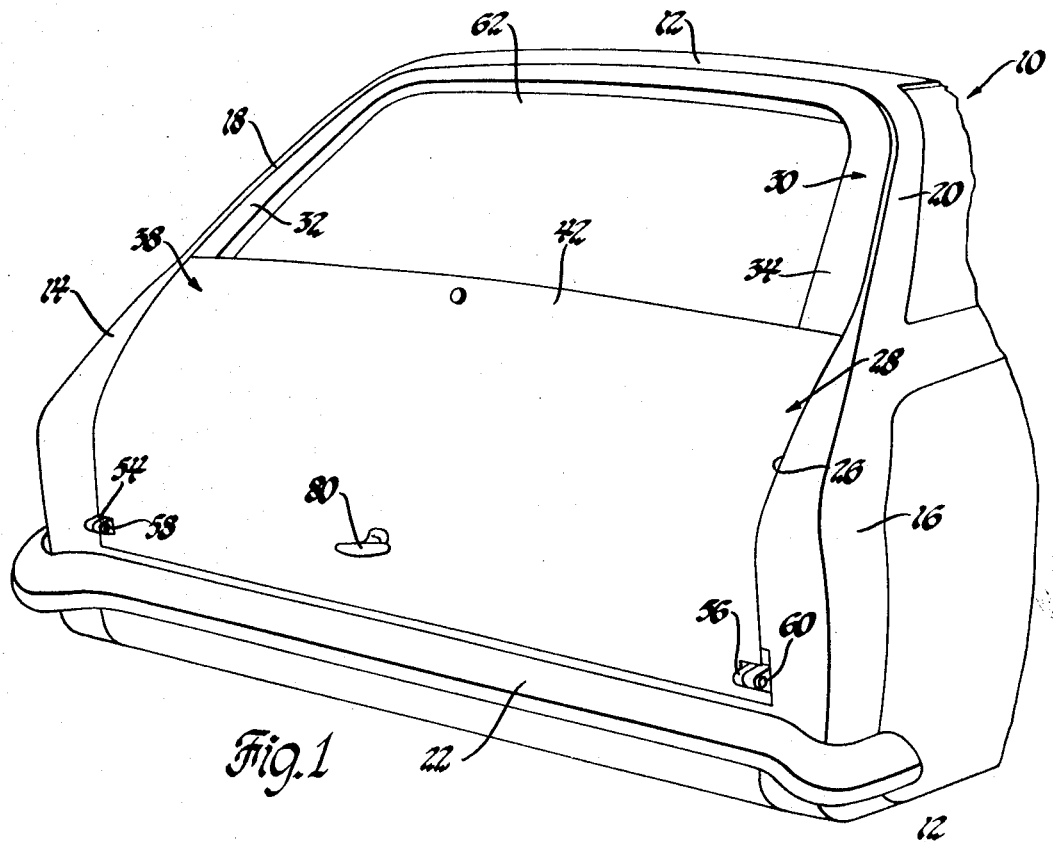

INVENTORS
John Himka, &
Samuel C. Pollock
D. L. Ellis
ATTORNEY

INVENTORS
John Himka, &
Samuel C. Pollock
D.L. Ellis
ATTORNEY

VEHICLE CLOSURE ARRANGEMENT

This invention relates generally to vehicle bodies and more particularly to a closure arrangement for the rear opening of a station-wagon-type vehicle body.

Conventional closure arrangements or tailgate assemblies for rear openings in station-wagon-type vehicle bodies typically include a gate member hinged to the body member for swinging movement as a drop-gate about a transverse axis at the lower margin of the rear opening, or for swinging movement about either a transverse axis at the lower margin of the rear opening or as a door about a vertical axis at one of the side margins of the rear opening, or for swinging movement as a lift-gate about a transverse axis at the upper margin of the rear opening. The first two mentioned arrangements provide convenient gate movement but always require clearance in the lower area rearwardly of the vehicle to permit movement of the gate member. The third mentioned arrangement, while not requiring such clearance in the lower area rearwardly of the vehicle, permits only one mode of gate operation under all circumstances which operational mode may prove inconvenient in certain situations. A closure arrangement or tailgate assembly according to this invention provides a gate member normally operable in the convenient drop-gate mode yet moveable as a unit with a frame member in the lift-gate mode to completely expose the rear opening without requiring clearance in the lower area rearwardly of the vehicle.

The primary feature, then, of this invention is that it provides a new and improved vehicle body closure arrangement. Another feature of this invention is that it provides a closure arrangement moveable from a closed position closing a vehicle body opening to a first open position as a drop-gate or from the closed position to a second open position as a lift-gate. Yet another feature of this invention resides in the provision in the closure arrangement of a gate member pivotally mounted on a frame member which is pivotally mounted on the vehicle body so that the gate and frame members are swingable as a unit in a lift-gate mode about a transverse axis at the upper margin of the body opening from a position closing the opening to an open position completely exposing the opening, while the gate member is swingable in a drop-gate mode about the frame member axis from the aforementioned closing position to expose the rear opening and to define a horizontal platform on the vehicle body. A still further feature of this invention resides in the provision in the tailgate assembly of latching means operable to releasably maintain the gate member in fixed relationship to the frame member during lift-gate operation and the frame member in stationary relationship to the vehicle body during drop-gate operation.

These and other features of this invention will be readily apparent from the following specification and from the drawings wherein:

FIG. 1 is a perspective view of the rear portion of a station-wagon-type vehicle and showing the tailgate assembly closing the rear opening;

FIG. 2 is similar to FIG. 1 but showing the tailgate assembly exposing the rear opening in the drop-gate mode;

Figure 3:
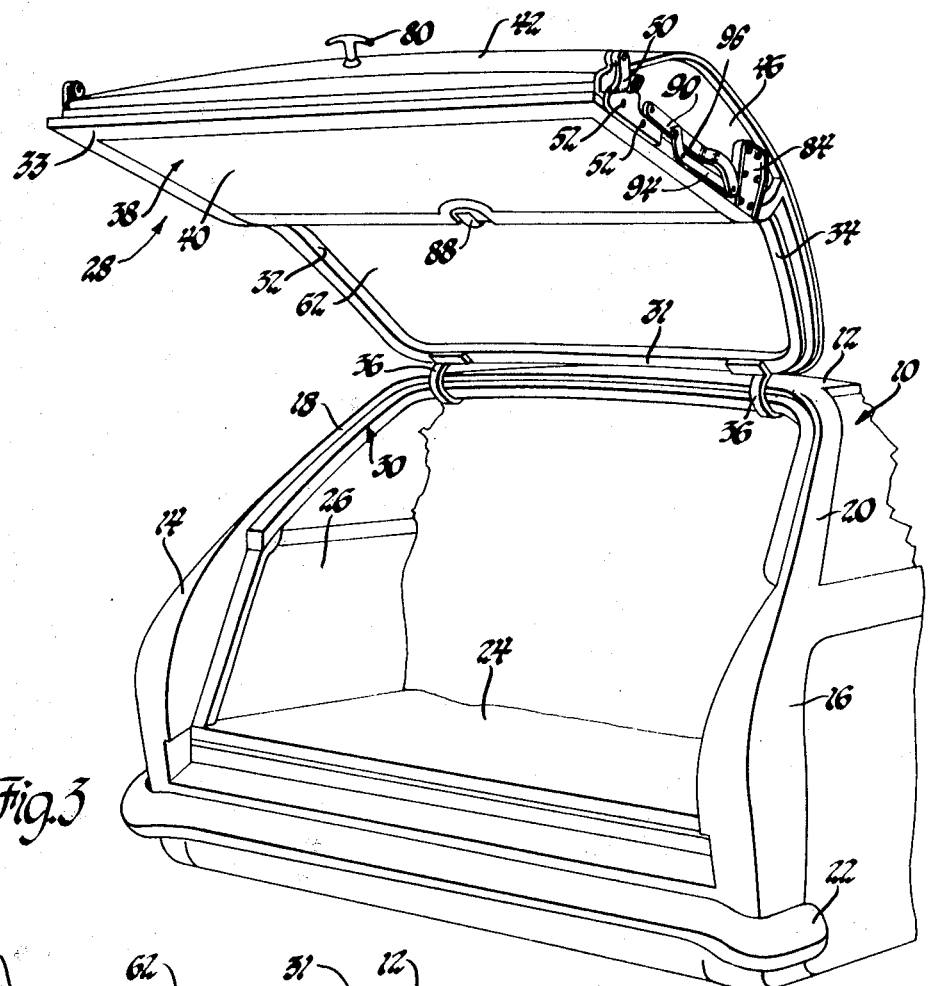
FIG. 3 is similar to FIG. 1 but showing the tailgate assembly exposing the rear opening in the lift-gate mode.

Referring now to FIGS. 1, 2, 3 and 4 of the drawings, a station-wagon-type vehicle includes a body generally designated 10 having a roof structure 12, quarter panel structures 14 and 16, rear pillar structures 18 and 20, and a rear bumper structure 22 extending transversely of the body. The body 10 further includes an interior floor structure 24 terminating generally at a rear access opening 26 of substantially the same height and width as the rear of the body 10. A closure arrangement or tailgate assembly according to this invention and generally designated 28 is mounted on the body 10 and is operable as described hereinafter in either a conventional drop-gate or a lift-gate mode to expose the rear opening 26.

The tailgate assembly 28 includes a generally rectangular frame member 30 having side members 32, 34 and top and bottom members 31, 33 respectively, FIGS. 2 and 3. As seen best in FIG. 6, each of the side, top and bottom members is fabricated from a conventional material, such as sheet steel, into a generally hollow rectangular tube while the side members 32, 34 have relieved portions 32', 34', respectively, extending from approximately the midpoints thereof to the bottom member 33, FIG. 2. Hinge means in the form of a pair of gooseneck hinges 36 mount the frame member 30 on the body 10 for pivotal movement about a generally transverse axis of the body member at the upper margin of the rear opening between a retracted position, FIG. 2, wherein the frame member 30 reposes generally within the rear opening 26 and an extended position, FIG. 3, wherein the frame member is rotated approximately 90° in a clockwise direction from the retracted position to a position above the rear opening 26.

With reference now to FIGS. 2, 3, 5 and 8, the tailgate assembly 28 further includes a gate member 38 having inner and outer panels 40 and 42, respectively, spaced apart by a pair of side panels 44 and 46. A pair of hinge members or brackets 48 and 50, fixedly secured to the lower ends of frame side members 32 and 34, respectively, by bolts 52 define a pair of apertures aligned on a transverse axis of the frame member. A further pair of hinge members or brackets 54 and 56, fixedly secured to side panels 44 and 46, respectively, of the gate member 38 define a pair of axially aligned apertures which register with the apertures in frame brackets 48 and 50, respectively. A pair of pivot pins 58 and 60 extend through respective pairs of the registering apertures to thereby mount the gate member on the frame member for pivotal movement about the transverse axis of the latter.

The transverse axis of the frame member, in the retracted position of the latter, is situated generally at the lower margin of the rear opening 26 so that the gate member is pivotable relative to the rear opening and frame member as a conventional drop-gate between a raised position, FIG. 1, resting in the relieved areas 32', 34' of the frame side members 32 and 34 and closing the lower portion of the rear opening and a lowered position exposing the rear opening and defining a horizontal platform on the body member generally at the level of the floor structure 24 and the lower margin of the rear opening 26, FIG. 2. In the raised position of the gate member, as seen in FIG. 1, a window panel 62 mounted within the gate member by conventional mans, not shown, for movement relative thereto closes the remainder of the rear opening in an up position thereof while exposing the remainder of the rear opening in a down position thereof, indicated in FIG. 2, housed between the inner and outer panels of the gate member. In the lift-gate mode, FIG. 3, the frame member and gate member, normally in the raised position of the latter, are swingable as a unit about the transverse axis at the upper margin of the rear opening to completely expose the rear opening without any obstructing projection in the lower area rearwardly of the vehicle.

Figure 4:
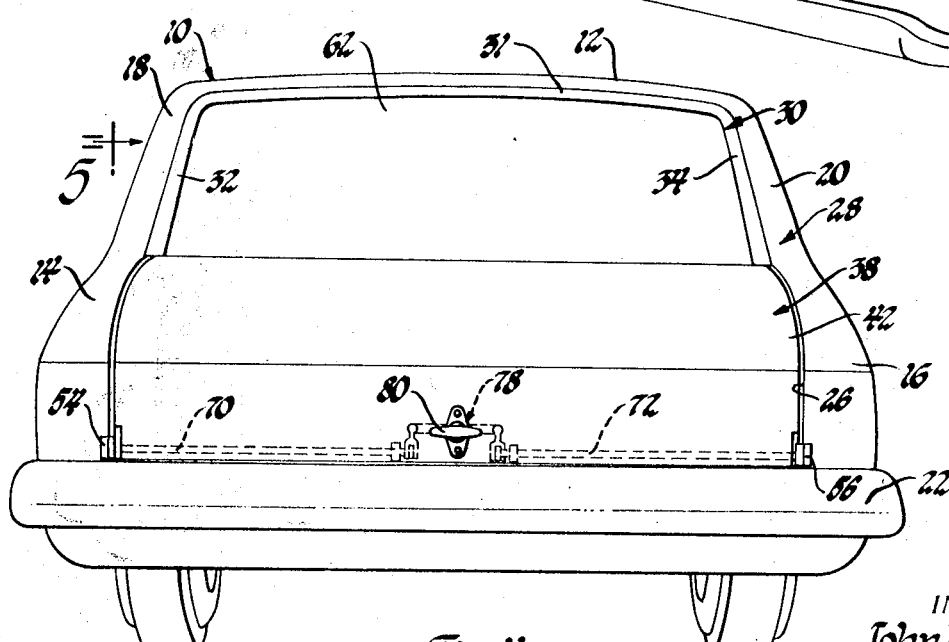
FIG. 4 is a rear elevational view of a station-wagon-type vehicle and showing the tailgate assembly closing the rear opening.
Figure 5:
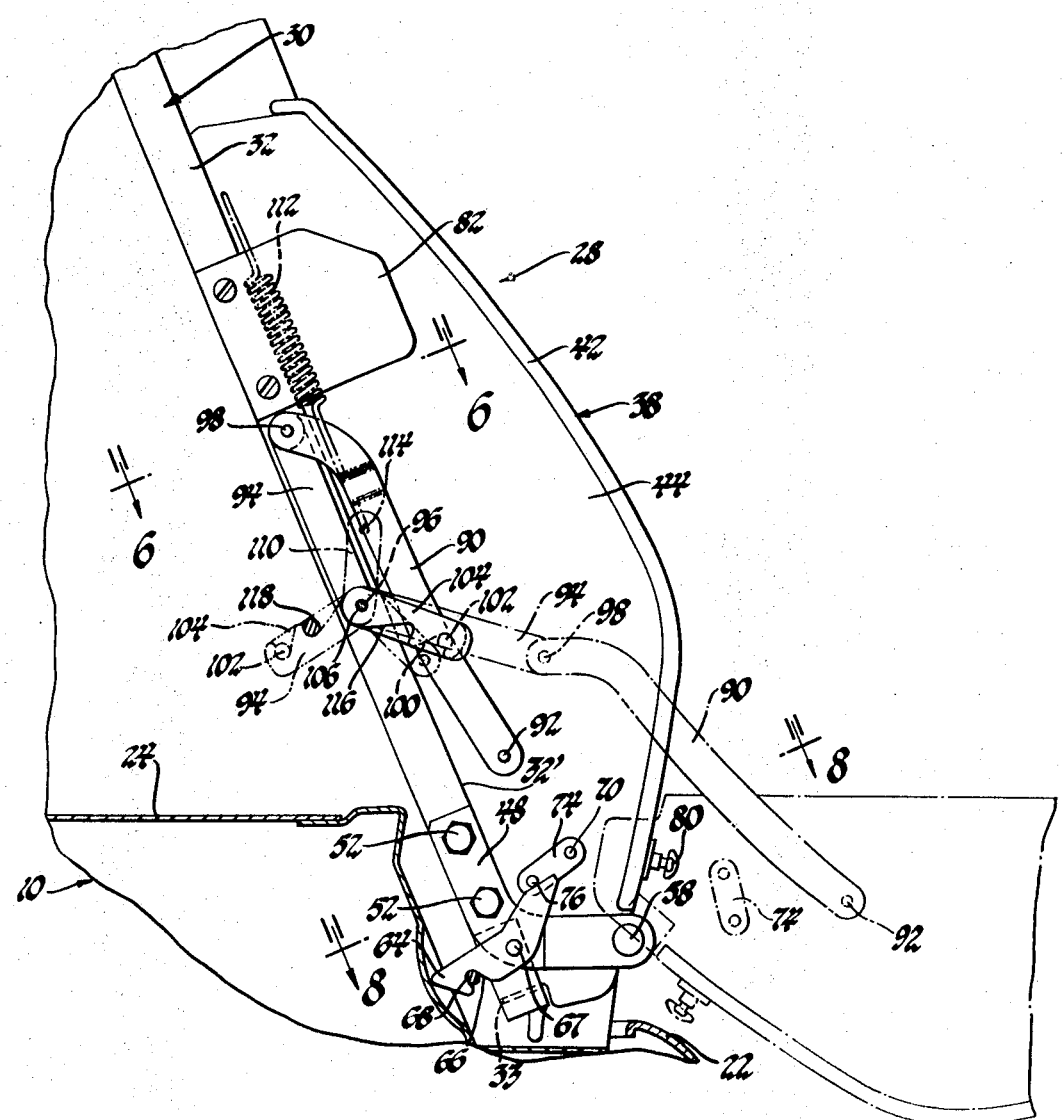
FIG. 5 is a sectional view taken generally along the plane indicated by lines 5—5 in FIG. 4.

As best seen in FIGS. 4, 5, 7 and 8, the tailgate assembly further includes latch means operable to releasably maintain the frame member 30 in the retracted position during drop-gate operation of the gate member 38 and to releasably maintain the gate member in raised position for lift-gate operation as a unit with the frame member. More particularly, as seen in FIG. 5, a hooked latch member 64 having a slot 66 therein is pivotally mounted at the lower end of the frame side member 32 at 67, it being understood that an equivalent latch member, not shown, is mounted on the opposite side of the frame on side member 34. A pair of pin strikers are fixedly secured to the quarter panel structure 14 and 16, only pin striker 68 on quarter panel structure 14 being shown, so that when the frame member is in the retracted position the slots on the latch members capture respective ones of the strikers to maintain the frame member in the retracted position, FIG. 5.

Figure 8:
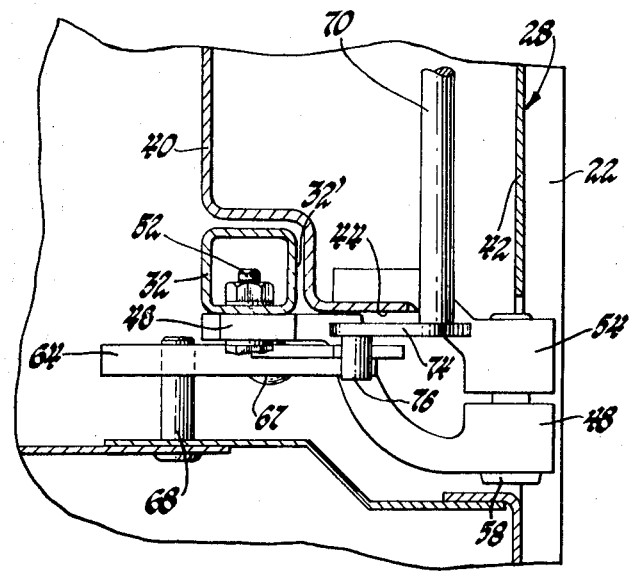
FIG. 8 is a sectional view taken generally along the plane indicated by lines 8—8 in FIG. 5.

With particular reference now to FIGS. 4, 5 and 8, for releasing the frame member for lift-gate movement a pair of actuator shafts 70 and 72 are rotatably journaled on the gate member between the inner and outer panels thereof with respective ones of a pair of cranks fixedly secured thereto at their distal ends, only crank 74 on actuator shaft 70 being shown. Each crank includes a pin, as pin 76 on crank 74, which pins overlie portions of respective ones of the latch members. Rotation of the actuator shafts 70 and 72 initiates contact between the crank pins and the latch members to rotate the latter about their pivotal connections to the frame member which rotation disengages the slots 66 from the strikers 68. With the slots thus disengaged, the frame member with the gate member thereon is freely swingable as a lift-gate about the transverse axis at the upper margin of the rear opening. To rotate the actuator shafts 70 and 72, a link and lever arrangement generally designated 78 is provided on the gate member and includes a handle 80 mounted generally centrally of the gate member at the lower edge thereof.

To maintain the gate member 38 in the raised position relative to the frame member 30, a pair of latch bolt strikers 82 and 84 are fixedly secured respectively to frame side members 32 and 34 and are engageable by the bolts of a pair of latch assemblies, mounted on the side panels of the gate member 32, only the dovetail housing 86 of such an assembly on side panel 46 being shown in FIG. 2. The latch assemblies and cooperating strikers will be understood as being of conventional nature including, for example, toothed rotary bolts and toothed strikers. An actuator assembly, not shown, including operating handle 88 on inner panel 40 is provided on the gate member for actuating the usual detent mechanism holding the latch bolts to release the gate member for swinging movement in the drop-gate mode.

Figure 6:
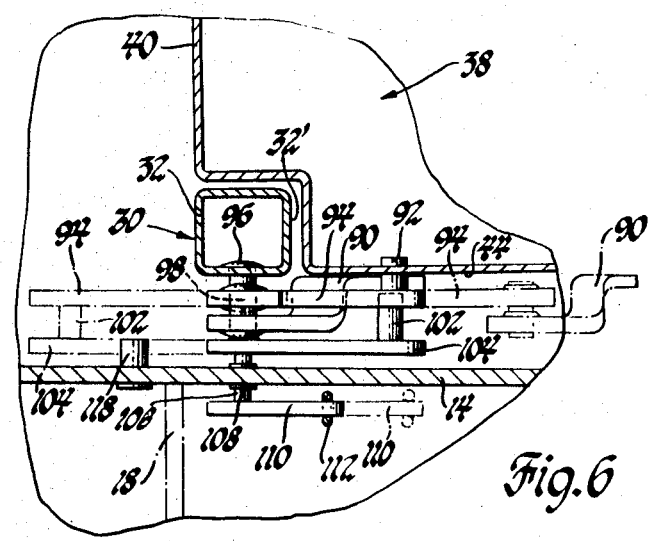
FIG. 6 is a sectional view taken generally along the plane indicated by lines 6—6 in FIG. 5.
Figure 7:
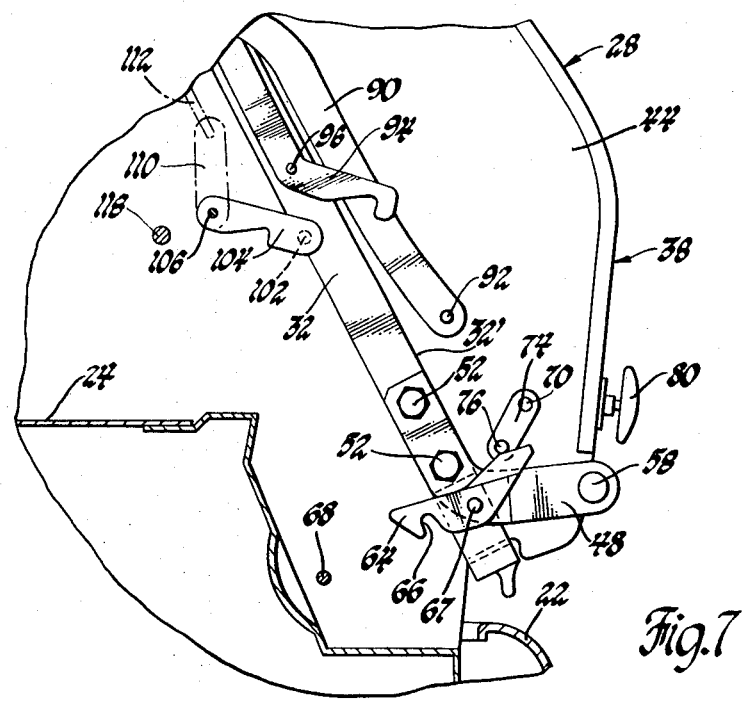
FIG. 7 is similar to FIG. 5 but showing the frame member in unlatched condition.

With reference now to FIGS. 5, 6 and 7, a counterbalancing arrangement is provided to facilitate movement of the gate member 38 between the raised and lowered positions in the drop-gate mode. Due to the limited space available within the side members 32 and 34 of the frame member, the counterbalancing arrangement is situated generally within the quarter panel structures and is connected to the gate member through a plurality of links including, first, a link 90 pivotally mounted on side panel 44 of the gate member at 92. A generally L-shaped link 94 pivotally mounted on frame side member 32 at 96 has one leg thereof pivotally connected to link 90 at 98. The other leg of the L-shaped link 94 has a slot 100 therein engageable with a pin 102 fixedly secured to a crank 104 laterally closely juxtaposed to link 94 and secured on the end of a stub shaft 106. Stub shaft 106 is suitably rotatably journaled on the quarter panel structure 14 at 108 coaxially with the pivot 96 of L-shaped link 94. A second crank 110 is fixedly secured to the end of stub shaft 106 within the quarter panel structure and has one end of a tire counterbalancing spring 112 pivotally connected thereto at 114. The other end of the counterbalancing spring is anchored to the body member within the rear pillar structure 18. It is to be understood that although only the counterbalancing arrangement on the left side, FIG. 2, of the tailgate assembly has been described, an equivalent mechanism is located on the right side and functions in the same manner.

Referring now to FIG. 5, unlatching and swinging movement of gate member 38 in the drop-gate mode from the raised to the lowered position, shown respectively in solid and broken lines in FIG. 5, initiates translatory movement of the link 90 from the solid to the broken line position shown in FIG. 5. Translation of link 90 initiates clockwise rotation of link 94 about pivot 96 causing slot 100 thereof to pick up or engage the pin 102 and rotate the crank 104 clockwise. Rotation of crank 104 rotates stub shaft 106 and crank 110 to thereby expand the counterbalancing spring 112 as the gate member is lowered. After predetermined angular movement of the gate member, a slot 116 on the crank 104 engages a fixed pin 118 on the body member to prevent further rotation. With the pin 118 thus engaged the lowered position of the gate member is defined through links 94 and 90 which links also serve to support the gate member in the lowered position defining a horizontal platform on the body member, FIG. 2.

The expanded counterbalancing spring 112 aids in returning the gate member to the raised position by urging crank 110, stub shaft 106 and crank 104 in a counterclockwise direction, FIG. 5. The counterclockwise bias of crank 104, in turn, urges pin 102 in slot 100 to rotate the L-shaped lever 94 counterclockwise thus urging the link 90 to move from its broken line to its solid line position, FIG. 5, the latter corresponding to the raised position of the gate member. The counterbalancing arrangement is designed to separate into a pair of units during operation of the tailgate assembly in the lift-gate mode. More particularly, with reference to FIG. 7, when frame member 30 with gate member 38 latched in raised position thereon is rotated relative to the body member toward the extended position, slot 100 in the link 94 on the gate member merely disengages from the relatively stationary pin 102 of the crank 104 journaled on the quarter panel 14.

The remainder of the tailgate assembly 28 includes a counterbalance mechanism, not shown of conventional design operable to bias the frame member toward the extended position during lift-gate movement and operable to maintain the frame member in the extended position. Such a counterbalance mechanism may include torsion rods aligned generally on the pivotal axes of hinges 36 and connected therewith.

Referring now to FIGS. 1, 2, 3 and 4, when it is desired to operate the tailgate assembly in the drop-gate mode from the closed position, FIG. 1, the window panel 62 is moved from up to down position and operating handle 88 is grasped and actuated. The gate member 38 is then swung outwardly about the transverse axis of the frame member 30 at the lower margin of the rear opening against the action of counterbalancing spring 112 until the lowered position of the gate member is achieved, FIG. 2. To return the gate member to the raised position, a motivating force is applied to the gate member to rotate the latter upwardly with the aid of counterbalance spring 112 until the latch bolts on the gate member engage the strikers 82 and 84 on the frame member 30.

When it is desired to operate the tailgate assembly in the lift-gate mode from the closed position, FIG. 1, handle 80 is grasped and actuated to disengage the latches from the fixed strikers on the body member thus allowing the frame member 30 with the gate member 38 thereon to be lifted with the aid of the counterbalancing arrangement, not shown, to the extended position, FIG. 3. The counterbalancing arrangement then maintains the frame member in extended position until it is desired to close the rear opening whereupon the frame member is grasped and lowered until the latches 64 automatically engage the fixed strikers to retain the frame member in the retracted position.

Having thus described the invention what is claimed is:

1. In a vehicle having an opening therein, a closure, and means supporting said closure on said vehicle body for pivotal movement in a first mode about a first axis situated generally at the lower margin of said opening and for pivotal movement in a second mode about a second axis situated generally at the upper margin of said opening, a first mode counterbalance arrangement comprising, spring means attached to a stationary anchor on said vehicle body, actuator means, means supporting said actuator means on said vehicle body for pivotal movement, means connecting said actuator means to said closure for effecting pivotal movement of the former in response to pivotal movement of the latter in the first mode and for effecting bodily movement of said actuator means in an arcuate path of motion about said second axis in response to pivotal movement of said closure in the second mode, and separable clutch means intermediate said spring means and actuator means, said clutch means operatively connecting said spring means and said actuator means during pivotal movement of said closure in the first mode so that the latter is resiliently urged in one direction of pivotal movement, said clutch means being further operative to disconnect said spring means and said actuator means thereby to permit unimpeded bodily movement of the latter during pivotal movement of said closure in the second mode.

2. In a vehicle body having an opening therein, the combination comprising, a frame member, means supporting said frame member on said vehicle body for pivotal movement into and out of said opening about an axis of said vehicle body situated generally adjacent the upper margin of said opening, a closure, means supporting said closure on said frame member for pivotal movement relative thereto about an axis thereof and for unitary movement therewith, said frame member axis being situated generally adjacent the lower margin of said vehicle body opening when said frame member is located in said opening so that said closure is supported on said vehicle body for pivotal movement relative to said opening and to said frame member in a drop-gate mode about an axis situated at the lower margin of said opening and relative to said opening as a unit with said frame member in a lift-gate mode about an axis situated generally adjacent the upper margin of said opening, actuator means, means supporting said actuator means on said frame member for unitary movement therewith and for pivotal movement relative thereto, means operatively connecting said actuator means and said closure for effecting pivotal movement of the former in response to pivotal movement of the latter in the drop-gate mode, spring means attached to a stationary anchor on said vehicle body, and separable clutch means intermediate said spring means and actuator means, said clutch means operatively connecting said spring means and said actuator means during pivotal movement of said closure in the drop-gate mode so that the latter is resiliently urged in one direction of pivotal movement, said clutch means being further operative to disconnect said spring means and said actuator means thereby to permit unimpeded unitary pivotal movement of said frame member and said closure in the lift-gate mode.

3. In a vehicle body having an opening therein, the combination comprising, a frame member, means supporting said frame member on said vehicle body for pivotal movement into and out of said opening about an axis of said vehicle body situated generally adjacent the upper margin of said opening, a closure, means supporting said closure on said frame member for pivotal movement relative thereto about an axis thereof and for unitary movement therewith, said frame member axis being situated generally adjacent the lower margin of said vehicle body opening when said frame member is located in said opening so that said closure is supported on said vehicle body for pivotal movement relative to said opening and to said frame member in a drop-gate mode about an axis situated at the lower margin of said opening and relative to said opening as a unit with said frame member in a lift-gate mode about an axis situated generally adjacent the upper margin of said opening, a first bellcrank having a notch therein, means supporting said first bellcrank on said frame member for unitary movement therewith and for pivotal movement relative thereto, a connecting link, means pivotally attaching one end of said connecting link to said closure, means pivotally attaching the other end of said connecting link to said first bellcrank so that pivotal movement of said closure in the drop-gate mode causes pivotal movement of said first bellcrank, a coil spring having a first end thereof affixed to a stationary anchor on said vehicle body, a second bellcrank, means supporting said second bellcrank on said vehicle body for pivotal movement about a fixed axis thereof, means attaching a second end of said coil spring to said second bellcrank so that the former resiliently urges the latter in one direction of pivotal movement, and means on said second bellcrank defining a rigid abutment adapted for reception in said notch in said first bellcrank, said notch in said first bellcrank engaging said abutment on said second bellcrank in response to pivotal movement of said closure in the drop-gate mode so that said second bellcrank is pivoted by said first bellcrank against said coil spring to effect counterbalancing of said closure in the drop-gate mode, said first bellcrank being separable from said second bellcrank so that pivotal movement of said closure as a unit with said frame member in the lift-gate mode is unimpeded.